United States Patent [19]

Mueller et al.

[11] Patent Number: 5,064,549
[45] Date of Patent: Nov. 12, 1991

[54] PREPARATION OF STABILIZED CHROMIUM DIOXIDE WITH SODIUM TETRACARBONYLFERRATE

[75] Inventors: Michael W. Mueller, Plankstadt; Ekkehard Schwab, Neustadt; Helmut Auweter, Limburgerhof; Rainer Feser, Gruenstadt; Bernhard Boettcher, Weisenheim; Norbert Mueller, Friedelsheim; Wolfgang Kochanek, Neustadt, all of Fed. Rep. of Germany

[73] Assignee: BASF Aktiengesellschaft, Ludwigshafen, Fed. Rep. of Germany

[21] Appl. No.: 615,861

[22] Filed: Nov. 20, 1990

[30] Foreign Application Priority Data

Dec. 16, 1989 [DE] Fed. Rep. of Germany ....... 3941578

[51] Int. Cl.$^5$ .............................................. C01G 37/27
[52] U.S. Cl. ................................... 252/62.51; 423/607
[58] Field of Search ...................... 423/607, 266, 265; 252/62.51

[56] References Cited

U.S. PATENT DOCUMENTS

| 3,512,930 | 5/1970 | Bottjer et al. | 423/607 |
| 3,687,726 | 8/1972 | Pye | 117/234 |
| 3,687,851 | 8/1972 | Hartmann | 423/607 |
| 3,767,580 | 10/1973 | Kitamoto et al. | 252/62.51 |
| 3,872,218 | 3/1975 | Collman et al. | 423/417 |
| 3,985,770 | 12/1976 | Collman et al. | 423/417 |
| 4,340,494 | 7/1982 | Ohlinger et al. | 423/607 |
| 4,374,118 | 2/1983 | Basile et al. | 252/62.51 |
| 4,670,177 | 6/1987 | Ohlinger et al. | 252/62.51 |

FOREIGN PATENT DOCUMENTS 2749757  5/1979  Fed. Rep. of Germany.

OTHER PUBLICATIONS

Cotton et al., "Advanced Inorganic Chemistry", Fourth Edition, pp. 1064–1065.
Fikentscher, *Cellulose Chemie*, 13, 58–64 (1932).

Primary Examiner—Michael L. Lewis
Assistant Examiner—Ngoc-Yen M. Nguyen
Attorney, Agent, or Firm—Keil & Weinkauf

[57] ABSTRACT

Stabilized acicular ferromagnetic chromium dioxide is prepared by reductive treatment of the chromium dioxide with $Na_2[Fe(CO)_4]$, and this material is present in magnetic recording media.

2 Claims, No Drawings

PREPARATION OF STABILIZED CHROMIUM DIOXIDE WITH SODIUM TETRACARBONYLFERRATE

The present invention relates to a process for the preparation of stabilized acicular ferromagnetic chromium dioxide by reductive treatment of the chromium dioxide with sodium tetracarbonylferrate, $Na_2[Fe(CO)_4]$, and magnetic recording media containing this material.

The preparation of acicular chromium dioxide and the use of this material for magnetic recording media have been described in many publications. Magnetic recording media which contain chromium dioxide generally have superior magnetic properties compared with recording media based on other magnetic oxides.

However, it is also known that the magnetic properties of recording media containing nonstabilized chromium dioxide deteriorate in the course of time. Ferromagnetic chromium dioxide in powder form is substantially stable in the absence of moisture and furthermore there is no detectable change in the magnetic properties over a long period. However, it has been observed that chromium dioxide can be attacked both by water and by other materials, for example the organic polymer binders used in the production of magnetic recording media, with decomposition to nonmagnetic constituents. In the case of magnetic recording media, this means not only a deterioration in the magnetic and hence electroacoustic properties but also an adverse effect on the mechanical properties. This deterioration is accelerated at elevated temperatures. There has therefore been no lack of attempts to overcome these disadvantages. For example, U.S. Pat. No. 3,512,930 describes the treatment of chromium dioxide powder with a reducing agent. In other processes, alumina coatings (U.S. Pat. No. 3,687,726) or coatings of sparingly soluble metal phosphates (U.S. Pat. No. 3,686,031) are produced. The application of metal compounds whose cations are capable of forming sparingly soluble chromates has also been disclosed (DE-B 21 52 331). JA-A-21 200/76 proposes the application of magnetic iron oxides to the surface in order to enclose the chromium dioxide particles, while according to DE-A-27 49 757 and also DE-A 3 240 337 iron-(III)-containing oxide precipitates are applied to the chromium dioxide. In another embodiment (DE-A 37 18 299) a chromium dioxide which has been treated according to U.S. Pat. No. 3,512,930 is coated with hydroxycarboxylic acids.

All these processes improve the stability of the chromium dioxide by virtue of the fact that either a precipitate, which may consist both of a foreign substance and a sparingly soluble chromate, is deposited on the particle surface or the particle surface is treated by reduction, with the result that a stable compound of trivalent chromium is also formed as a surface layer, on which chromium an organic compound can be additionally applied.

In spite of these efforts to ensure the stability of the chromium dioxide, and taking into account the appropriate safety measure during processing to give magnetic recording media, it is observed that the stability of the residual induction of these recording media is not unlimited. As shown by extensive investigations, the instability of the chromium dioxide material in a magnetic layer, in particular at elevated temperatures, is due predominantly to the humidity of the surrounding air.

As a result of attack by atmospheric humidity, the chromium dioxide undergoes cleavage, in a reverse reaction to its preparation reaction, into a compound containing chromium(III) oxide and into chromate ions, the latter oxidizing the organic components of the magnetic layer. Thus, the stability of the chromium dioxide in the magnetic layer is scarcely influenced at 0% relative humidity, and it is only high relative humidity of, for example, 95% that causes deterioration even in the case of stabilized chromium dioxide. This shows that stabilization of the chromium dioxide according to the prior art improves the chromium dioxide but under unfavorable conditions is not sufficient to prevent the influence of water vapor.

A process which ensures excellent stabilization of the chromium dioxide has now been proposed (P 38 28 498.7). The disadvantage here, however, is that long reaction times are required for the formation of the $Cr^{3+}$ component on the surface and, owing to the dense surface layer of $Cr^{3+}$, the surface resistance increases. This can be reduced only by the addition of carbon black to the tape formulation, which however decreases the residual induction of the tape.

It is an object of the present invention to improve the known processes so that the disadvantages described do not occur. It is intended to provide a chromium dioxide which is substantially protected from disproportionation but, when processed to give magnetic recording layers, should have a low surface resistance coupled with a high residual induction of the tape and can be produced with high efficiency.

We have found that this object is achieved by a process for the preparation of stabilized acicular ferromagnetic chromium dioxide by reacting oxides of trivalent and hexavalent chromium at from 200° to 600° C. in a high pressure reactor at from 100 to 700 bar in the presence of water with the addition of one or more modifiers and subsequent reductive treatment of the surface of the synthesized chromium dioxide in an aqueous suspension with formation of a compound of trivalent chromium on the surface, if $Na_2[Fe(CO)_4]$ in alkaline, aqueous solution is used as the reducing agent.

The preparation of acicular ferromagnetic chromium dioxide is known, as is the reductive treatment of the chromium dioxide for the purpose of stabilization. For example, EP-B 27 640 and EP-A 198 110 describe the preparation of chromium dioxide materials which have particularly advantageous magnetic properties and narrow particle size distributions, owing to the use of special modifiers based on antimony, selenium, tellurium and/or iron or their compounds. In the preparation, it may be advantageous to subject the chromium dioxide to a heat treatment prior to the reductive treatment. This can be done, for example, by comminuting the chromium dioxide obtained in the synthesis to an agglomerate size of from 0.1 to 1 mm and then heating it in the air at from 150° to 450° C., in general from 300° to 380° C.

To carry out the novel process, the chromium dioxide heated to 150°-450° C. is suspended in water by vigorous stirring. It is advantageous to maintain a ratio of 1 part of powder to not less than 10 parts of water. This suspension is then brought to a pH of from 7 to 14, in particular from 9 to 12, with NaOH, the temperature being from 10° to 100° C., preferably from 20° to 30° C., and from 20 to 60 g of an $Na_2[Fe(CO)_4]$ solution per 100 g of $CrO_2$ are then added in the course of from 5 to 60 minutes. This solution is obtained by passing $Fe(CO)_5$ into sodium hydroxide solution. The mixture is stirred for a further 0–240, usually 10–20, minutes and filtered, and the moist filter cake is dried at from room temperature to less than 100° C., usually from 50° to 70° C.

The chromium dioxide obtained by the novel process has an extremely low content of elutable chromium(VI) ions while retaining the excellent magnetic properties of the material, and a low surface resistance. This improvement in the properties of the chromium dioxide material is displayed in particular when it is used for the production of magnetic recording media and is embedded in the organic polymer-containing magnetic layer.

Processing of the chromium dioxide prepared according to the invention to give magnetic recording media is carried out by known methods. For the production of the magnetic layer, from 2 to 5 parts by weight of chromium dioxide are processed with one part of the binder or binder mixture and the suitable dispersants, lubricants and other conventional additives in a total amount of not more than 10% by weight, based on the chromium dioxide, to give a dispersion. The dispersion thus obtained is filtered and is applied to the nonmagnetic substrate in one or more thin layers by means of a conventional coating apparatus, for example a knife coater. Before the liquid coating mixture is dried at from 50° to 90° C., magnetic orientation of the chromium dioxide particles may be carried out. For a special surface treatment of the magnetic layer, the coated film webs are passed between heated polished rollers under pressure. Thereafter, the thickness of the magnetic layers is usually from 1.5 to 12 $\mu$m.

The known polymer binders, such as acrylate polymers, polyvinyl acetates, e.g. polyvinylformal or polyvinylbutyral, relatively high molecular weight epoxy resins, polyurethanes and mixtures of these and similar binders, may be used as binders for the magnetic layers. The elastomers which are soluble in a volatile organic solvent, and virtually isocyanate-free linear polyesterurethanes, as can be prepared by reacting a polyester of an aliphatic dicarboxylic acid of 4 to 6 carbon atoms, such as adipic acid, and one or more aliphatic diols of 3 to 10 carbon atoms, such as 1,2- and 1,3-propylene glycol, butane-1,4-diol, diethylene glycol, neopentylglycol or octane-1,8-diol, with a diisocyanate of 6 to 24, in particular 8 to 20, carbon atoms, such as toluylene diisocyanate or 4,4'-diisocyanatodiphenylmethane, preferably in the presence of a relatively small amount of a glycol of 4 to 10 carbon atoms, such as butane-1,4-diol, which produces chain extension, have proven advantageous. Preferred polyesterurethanes are those obtained from adipic acid, butane-1,4-diol and 4,4'-diisocyanatodiphenylmethane. Preferred polyesterurethanes have a Shore hardness A of from 70 to 100, a tensile strength of from 40 to 42 N/mm$^2$ (according to DIN 53,455) and an elongation at break (according to DIN 53,455) of about 440–560%. The K value according to H. Fikentscher (Cellulose-Chemie 13 (1932), 58 et seq.) is from 40 to 60 for the particularly suitable polymer binders.

Magnetic recording media which are produced using the chromium dioxide prepared according to the invention possess not only electroacoustic characteristics which are known to be good but also very good stability under high temperature and humidity conditions as well as low surface resistance, high residual induction of the tape and good mechanical properties, in particular adhesive strength. They have in particular residual induction of the magnetizable carbon black-free layer of not less than 140 mT, which decreases by less than 3% in the environmental test, and a surface resistance of less than 400 M$\Omega$.

The Examples which follow illustrate the invention and compare it with Comparative Experiments. In the Examples and Comparative Experiments which follow, parts and percentages are by weight, unless stated otherwise.

EXAMPLE 1

47 5 g of water were initially taken in a reaction vessel having a volume of 300 ml. Thereafter, 121.7 g of chromic anhydride (CrO$_3$) were initially added while stirring. After 10 minutes, 0.57 g of potassium antimonyl tartrate (KSbO(C$_4$H$_4$O$_6$) . 5H$_2$O, molecular weight 333.93), i.e. 0.148% by weight of Sb$_2$O$_3$, based on chromium dioxide, and 0.51 g of acicular gamma-Fe$_2$O$_3$, i.e. 0 3% by weight of Fe$_2$O$_3$, based on chromium dioxide, were added. When the gas evolution which began as a result of the addition of the antimony-containing modifier had ceased, 60 g of chromium(III) oxide were introduced with constant stirring, and stirring was continued for a further 20 minutes. The reaction slurry was then heated to 300°–350° C. in an autoclave. Chromium dioxide formed during this procedure. The oxygen formed causes a build-up of pressure, which was kept at 300–400 bar by means of a control valve. After the end of the reaction, the reactor was let down and cooled so that chromium dioxide having a residual moisture content of from 1 to 5% was obtained. It was removed mechanically from the reaction vessel, milled, and heated for 60 minutes in the air at 380° C. Thereafter, 100 g of the product were suspended in 1 l of H$_2$O and brought to pH 9 with 25% strength NaOH solution. 38.9 g of an Na$_2$[Fe(CO)$_4$] solution were then added dropwise in the course of 5 minutes at 22° C.

This solution consisted of 20% by weight of Fe(CO)$_5$ and 21.6% by weight of NaOH, the remainder being water.

It was immediately filtered, washed, and dried at 50° C. under reduced pressure. For the resulting chromium dioxide, the BET specific surface area in [m$^2$/g] was determined according to DIN 66,136 by means of a Ströhlein areameter from Ströhlein, Düsseldorf, by the one-point difference method according to Haul and Dümbgen, and the magnetic properties were determined using a vibrating sample magnetometer in a magnetic field of 400 kA/m at a mean sample density p[g/cm$^3$], i.e. the coercive force Hc in (kA/m) and the specific remanance Mr/pin [nTm$^3$/g]. Furthermore, the content of chromium(VI) ions was determined, the determination being carried out photometrically using diphenylcarbazide (DIN 53,780) in an aqueous extract which is prepared by the following method: 1.0000 g of CrO$_2$ was weighed into a 150 ml beaker (low form) using an analytical balance, and 100 ml of distilled H$_2$O were added. An apparatus having a magnetic stirrer was preheated with a setting of 320° C. until the temperature controller switched. The sample was then stirred with the magnetic stirrer (50 rpm) for 10 minutes and boiled for 5 minutes. After cooling for 10 minutes, the sample was filtered through two folded filters into a 500 ml graduated flask and washed with cold distilled water and the content of the graduated flask was made up to the calibration mark. The iron determination was carried out by means of atomic absorption spectroscopy.

The results of the measurements are shown in Table 1.

EXAMPLE 2

A pigment was prepared as described in Example 1, except that only 20 g of $Na_2[Fe(CO)_4]$ solution of the same concentration were used. The results of the measurements are shown in Table 1.

COMPARATIVE EXPERIMENT 1

A $CrO_2$ prepared hydrothermally under the same conditions and with the same amounts of dopants as described in Example 1 were suspended for 60 minutes in 10 parts by weight of water per part by weight of $CrO_2$ after the heating step at 380° C., and 0.2 part by weight of sodium sulfite, dissolved in water, was added per part by weight of $CrO_2$. Thereafter, the suspension heated at 85° C. was stirred for 45 minutes, then washed with water and dried at 55° C. under reduced pressure.

The results of the measurements are shown in Table 1.

COMPARATIVE EXPERIMENT 2

A chromium dioxide prepared as described in Comparative Experiment 1 was suspended in water, the ratio of water to chromium dioxide being 12:1; a 30% strength $FeCl_2$ solution (3.4%, based on $CrO_2$, of Fe) was then added to this suspension, which was heated to 45° C. under a nitrogen blanket and then brought to a pH of 10 with 15% strength sodium hydroxide solution. The entire mixture was then stirred thoroughly for 5 hours and gassed with air at constant pH, and the resulting solid was filtered off under suction, washed and dried.

The results of the measurements are shown in Table 1.

TABLE 1

|  | Hc [kA/m] | Mm/ρ [nTm³/g] | Mr/ρ [nTm³/g] | $CrO_3$ mg $CrO_3$/g $CrO_3$ | Fe content % by weight |
| --- | --- | --- | --- | --- | --- |
| Example 1 | 44 | 85 | 41 | 0.93 | 1.4 |
| Example 2 | 43 | 89 | 42 | 2.4 | 1.3 |
| Comparative Experiment 1 | 39 | 85 | 41 | 0.8 | 0.41 |
| Comparative Experiment 2 | 41 | 79 | 39 | 0.7 | 3.3 |

The powders described in Table 1 were used to produce magnetic recording layers by the following method.

EXAMPLES B1, B2, BV1 and BV2

In a mill having a capacity of 500 parts by volume and containing 100 parts by volume of steel balls having a diameter of 1.5 mm, 40 parts of the chromium dioxide samples stated in Table 1 were mixed with 175 parts of a 13% strength solution of a thermoplastic polyesterurethane obtained from adipic acid, butane-1,4-diol and 4,4'-diisocyanatodiphenylxethane in a mixture of equal amounts of tetrahydrofuran and dioxane, 150 parts of a 13% strength solution of a commercial polyvinylformal in a mixture of equal amounts of tetrahydrofuran and dioxane, 24 parts of a solvent mixture consisting of equal amounts of tetrahydrofuran and dioxane and 1 part of zinc stearate, and the mixture was dispersed for 4 hours. Thereafter, the same amounts of the two binder solutions, 13.5 parts of the stated solvent mixture and 0.1 part of a commercial silicone oil were added and dispersing was carried out for a further 30 minutes. The dispersion was then filtered and was applied to a polyethylene terephthalate film on a conventional coating apparatus using a knife coater, so that, after drying and calendering, a dry layer 5.5 μm thick resulted. Immediately after the liquid dispersion had been poured on, the acicular chromium dioxide particles were oriented along the recording direction by means of a magnetic field.

The surface of the magnetic layer had an average peak-to-valley height Rz of 0.15 μm, measured according to DIN 4756, Sheet 1. The coated film was slit into 3.81 mm wide magnetic tapes.

The magnetic tapes were tested as follows:

1. Magnetic properties

The magnetic properties of the resulting magnetic tapes were determined using the vibrating sample magnetometer in a magnetic field of 160 kA/m. The coercive force Hc in [kA/m] and the residual induction Mr in [mT] were measured and the orientation ratio Rf was calculated as the quotient of the residual induction in the preferred magnetic direction to that in the crosswise direction.

2. Electroacoustic properties 2.1 Stability under high temperature and humidity conditions The stability under high temperature and humidity conditions was determined for the magnetic recording medium at 50° C. and 70% relative humidity; for this purpose, a magnetic recording medium was stored for two weeks in a conditioning cabinet under these conditions, and the residual induction was measured at room temperature and stated as a percentage of the initial value. The magnetic properties were determined using a vibrating sample magnetometer in a magnetic field of 160 kA/m.

3. Surface resistance

The surface resistance (SR) was determined indirectly by measuring the electrical conductivity of the magnetic tape. The measurement was carried out using a digital milli/tera ohmmeter (Camphausen, Berlin) for the resistance indicating range of from $10^{-4}$ to $2 \cdot 10^{14}$ ohm.

A support having metal tongues (DIN 53,482) a distance apart corresponding to the measured tape width was used as the measuring electrode for tape measurement, so that the measured values of the layer resistance for various tape widths are directly comparable owing to the square shape of the measured area.

Measurement conditions

Test conditions: 23° C., 50% relative humidity
Measurement voltage: 10 volt

|  | B1 | B2 | BV1 | BV2 |
| --- | --- | --- | --- | --- |
| Hc [kA/m] | 43 | 42 | 39 | 40 |
| Mr [mT] | 149 | 151 | 154 | 143 |
| Stability [%] | 98.3 | 97.8 | 98.3 | 98.5 |
| SR [MΩ] | 150 | 52 | 2000 | 5400 |

We claim:

1. A process for the preparation of stabilized acicular chromium dioxide by reacting oxides of trivalent and hexavalent chromium at from 200° to 600° C. in a high pressure reactor at from 100 to 700 bar in the presence of water with the addition of at least one modifier material to improve magnetic properties or the particle size distribution and subsequent reductive treatment of the surface of the synthesized chromium dioxide in an aqueous suspension with formation of a compound of trivalent chromium on the surface, wherein $Na_2[Fe(CO)_4]$ in alkaline, aqueous solution is used as the reducing agent.

2. A process as claimed in claim 1, wherein the chromium dioxide obtained after the synthesis is heated at from 150° to 450° C. prior to the reductive treatment.

* * * * *